(12) United States Patent
Bucknor et al.

(10) Patent No.: US 11,712,977 B2
(45) Date of Patent: Aug. 1, 2023

(54) BATTERY-ELECTRIC-VEHICLE ASSISTED TOWING CONCEPT

(71) Applicant: GM Global Technology Operations LLC, Detroit, MI (US)

(72) Inventors: Norman K. Bucknor, Troy, MI (US); Madhusudan Raghavan, West Bloomfield, MI (US); Venkata Prasad Atluri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 17/077,649

(22) Filed: Oct. 22, 2020

(65) Prior Publication Data
US 2022/0126714 A1    Apr. 28, 2022

(51) Int. Cl.
*B60L 53/30*        (2019.01)
*B60L 53/53*        (2019.01)
*B60L 53/66*        (2019.01)

(52) U.S. Cl.
CPC .............. *B60L 53/30* (2019.02); *B60L 53/53* (2019.02); *B60L 53/66* (2019.02); *B60L 2200/28* (2013.01)

(58) Field of Classification Search
CPC ........ B62D 53/005; B60D 1/00; B60D 1/481; B60D 1/62; B60D 2001/005; B60L 50/61; B60L 2200/28; Y02E 60/00; Y02T 10/62; Y02T 10/70; Y02T 10/7072; Y04S 10/126
See application file for complete search history.

(56) References Cited

U.S. PATENT DOCUMENTS

| | | | | | |
|---|---|---|---|---|---|
| 3,690,397 | A | * | 9/1972 | Parker | B60L 50/66 180/68.5 |
| 4,199,037 | A | * | 4/1980 | White | B60K 3/04 180/65.245 |
| 4,269,280 | A | * | 5/1981 | Rosen | B60L 50/53 60/711 |
| 4,556,247 | A | * | 12/1985 | Mahaffey | B60P 3/32 322/1 |
| 5,559,420 | A | * | 9/1996 | Kohchi | H01M 50/209 280/492 |
| 6,390,215 | B1 | * | 5/2002 | Kodama | B60L 50/62 180/2.1 |
| 6,788,504 | B2 | * | 9/2004 | Vanderkolk | H02H 3/33 361/45 |

(Continued)

FOREIGN PATENT DOCUMENTS

| DE | 102012016234 A1 | 2/2014 |
|---|---|---|
| DE | 102019202784 A1 | 11/2019 |

*Primary Examiner* — Elim Ortiz
(74) *Attorney, Agent, or Firm* — Vivacqua Crane PLLC

(57) ABSTRACT

A system to extend a towing range and maneuverability of an automobile vehicle during a towing operation includes a battery-electric-vehicle (BEV) having a vehicle energy pack providing operational energy to the BEV. A powered trailer is releasably connected to the BEV. A trailer module is provided with the powered trailer, the trailer module communicating between the powered trailer and the BEV. A propulsion unit is provided with the powered trailer and is in communication with trailer module and with the BEV using the trailer module. The propulsion unit enhances launch of the BEV and provides an acceleration assist to the BEV.

13 Claims, 2 Drawing Sheets

(56) References Cited

U.S. PATENT DOCUMENTS

| | | | | |
|---|---|---|---|---|
| 6,938,400 B2* | 9/2005 | Fillman | ................... | B60L 50/64 |
| | | | | 56/10.6 |
| 7,279,640 B2* | 10/2007 | White | ...................... | B60D 1/62 |
| | | | | 439/483 |
| 7,514,803 B2* | 4/2009 | Wilks | ..................... | B60L 53/80 |
| | | | | 322/1 |
| 7,642,665 B2* | 1/2010 | Konop | .................. | F02B 63/047 |
| | | | | 290/22 |
| 8,215,436 B2* | 7/2012 | DeGrave | ................ | B60L 50/40 |
| | | | | 180/209 |
| 2005/0136726 A1* | 6/2005 | Kohchi | ................... | B60L 53/16 |
| | | | | 439/352 |
| 2006/0076836 A1* | 4/2006 | Plishner | ................. | B60L 50/62 |
| | | | | 307/66 |
| 2008/0169144 A1 | 7/2008 | DeGrave et al. | | |
| 2010/0065344 A1* | 3/2010 | Collings, III | ............. | B60L 3/10 |
| | | | | 180/2.1 |
| 2010/0187031 A1* | 7/2010 | Waszak | ................ | B60W 20/12 |
| | | | | 903/905 |
| 2010/0252339 A1* | 10/2010 | Bibeau | .................... | B60K 6/48 |
| | | | | 180/11 |
| 2011/0253463 A1* | 10/2011 | Smith | ..................... | H02J 3/381 |
| | | | | 180/11 |
| 2013/0257144 A1* | 10/2013 | Caldeira | ................ | B60L 50/53 |
| | | | | 307/9.1 |

\* cited by examiner

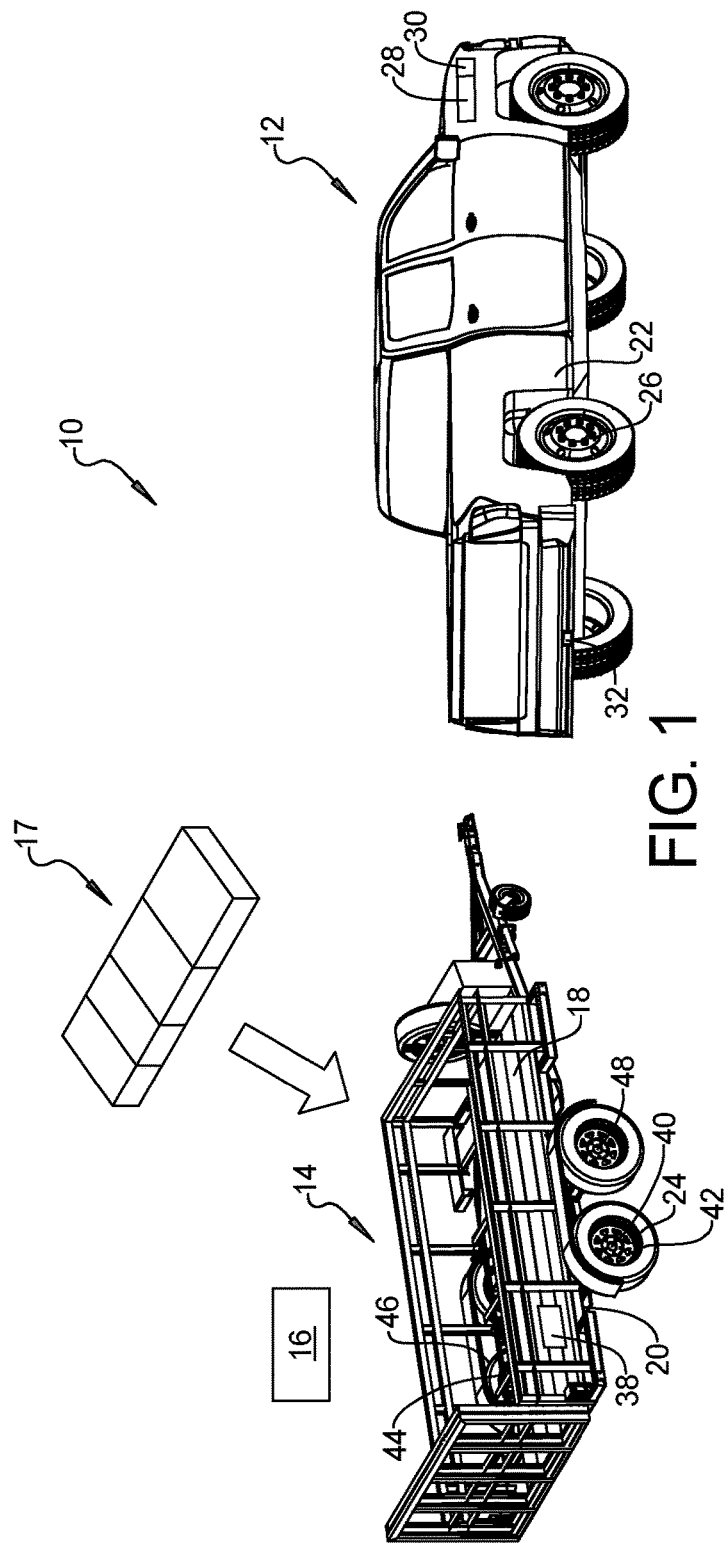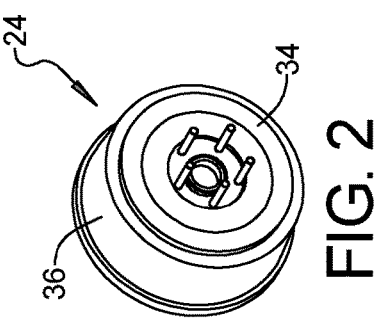

ant known gasoline engine powered pickup trucks which have a minimum 7100-pound towing capacity. Gasoline engine powered pickup trucks may also have a greater towing range than BEVs during a towing operation.

BATTERY-ELECTRIC-VEHICLE ASSISTED TOWING CONCEPT

INTRODUCTION

The present disclosure relates to battery-electric-vehicle towing and trailers for towing behind a battery-electric-vehicle.

Towing is a significant challenge for battery-electric-vehicles, hereinafter BEVs due to increased energy consumption and thermal loading. As an example, an electric BEV pickup towing specification is approximately 5000 pounds. This is lower than a towing specification for equivalent known gasoline engine powered pickup trucks which have a minimum 7100-pound towing capacity. Gasoline engine powered pickup trucks may also have a greater towing range than BEVs during a towing operation.

Thus, while current battery-electric-vehicles when performing a towing operation achieve their intended purpose, there is a need for a new and improved system and method for increasing a towing capacity and extending a towing range of a battery-electric-vehicle.

SUMMARY

According to several aspects, a system to extend the range and maneuverability of an automobile vehicle during a towing operation includes a battery-electric-vehicle (BEV) having a rechargeable energy storage system (battery pack) providing operational energy for the BEV. A powered trailer is releasably connected to the BEV. A propulsion unit is provided with the powered trailer and is in communication with the BEV, the propulsion unit enhancing launch of the BEV and providing an acceleration assist to the BEV.

In another aspect of the present disclosure, the propulsion unit incorporates a battery pack, the battery pack providing energy to supplement an energy of the vehicle energy pack.

In another aspect of the present disclosure, the battery pack is configured as an energy pack.

In another aspect of the present disclosure, the battery pack is configured as a power pack.

In another aspect of the present disclosure, the propulsion unit incorporates at least one electric motor, the at least one motor energized to provide a propulsion force to the powered trailer and to enhance propulsion of the BEV.

In another aspect of the present disclosure, the at least one motor is energized solely by the vehicle energy pack of the BEV.

In another aspect of the present disclosure, the at least one motor defines a first motor positioned in a first wheel hub of the powered trailer and a second motor positioned in a second wheel hub of the powered trailer positioned oppositely from the first wheel hub.

In another aspect of the present disclosure, the propulsion unit incorporates a battery pack and at least one motor powered by energy delivered from the battery pack, the at least one motor energized to provide a motive force to the powered trailer.

In another aspect of the present disclosure, the at least one motor defines a first motor and a second motor positioned oppositely from the first motor. A trailer module is provided with the powered trailer, the trailer module communicating between the powered trailer and the BEV and to the first motor and the second motor.

In another aspect of the present disclosure, the trailer module controls a first speed of the first motor different than a second speed of the second motor to enhance maneuverability of the powered trailer.

According to several aspects, a system to extend a towing range and maneuverability of an automobile vehicle during a towing operation includes a battery-electric-vehicle (BEV) having a vehicle energy pack providing operational energy to the BEV. A powered trailer is releasably connected to the BEV. A trailer module is provided with the powered trailer, the trailer module communicating between the powered trailer and the BEV. A propulsion unit is provided with the powered trailer and is in communication with trailer module and with the BEV using the trailer module. The propulsion unit enhances launch of the BEV and provides an acceleration assist to the BEV.

In another aspect of the present disclosure, the propulsion unit is configured as a first motor and a second motor positioned oppositely about the powered trailer from the first motor.

In another aspect of the present disclosure, the propulsion unit incorporates a battery pack, the battery pack providing energy to supplement an energy of the vehicle energy pack; and the first motor and the second motor are energized by the battery pack to provide a propulsion force to the powered trailer.

In another aspect of the present disclosure, the propulsion unit is configured as at least one motor connected to and rotating at least one axle of the towed trailer, the at least one motor energized by the battery pack to provide a propulsion force to the powered trailer.

In another aspect of the present disclosure, a trailer module is provided with the powered trailer, the trailer module communicating between the powered trailer and the BEV and to the propulsion unit.

In another aspect of the present disclosure, a vehicle module is provided with the BEV, wherein during a towing operation of the powered trailer by the BEV the powered trailer is mechanically and electrically connected to the BEV with operation of the propulsion unit and the vehicle energy pack connected to and controlled by the vehicle module.

In another aspect of the present disclosure, a communication link connects the BEV to the powered trailer to transfer energy and to provide a communication path between the BEV and the powered trailer.

According to several aspects, a method to extend a towing range and maneuverability of an automobile vehicle during a towing operation includes: positioning a rechargeable vehicle energy pack in a battery-electric-vehicle (BEV) to provide operational energy to the BEV; releasably connecting a powered trailer to the BEV; providing a trailer module with the powered trailer, with the trailer module communicating between the powered trailer and the BEV; connecting a propulsion unit positioned on the powered trailer in communication with the BEV via the trailer module; and energizing the propulsion unit by command from the trailer module to enhance launch of the BEV and to provide an acceleration assist to the BEV.

In another aspect of the present disclosure, the method further includes: commanding operation of a first motor of the propulsion unit and a second motor of the propulsion unit; and connecting the BEV to the powered trailer using a communication link.

In another aspect of the present disclosure, the method further includes reducing a thermal load on the BEV by distributing a torque between the BEV and the powered trailer thereby increasing an overall system efficiency.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a side perspective view of a battery-electric-vehicle and a powered trailer according to an exemplary aspect;

FIG. 2 is a side perspective view of a wheel having an electric motor for propulsion of the powered trailer of FIG. 1.

DETAILED DESCRIPTION

Figure 3:
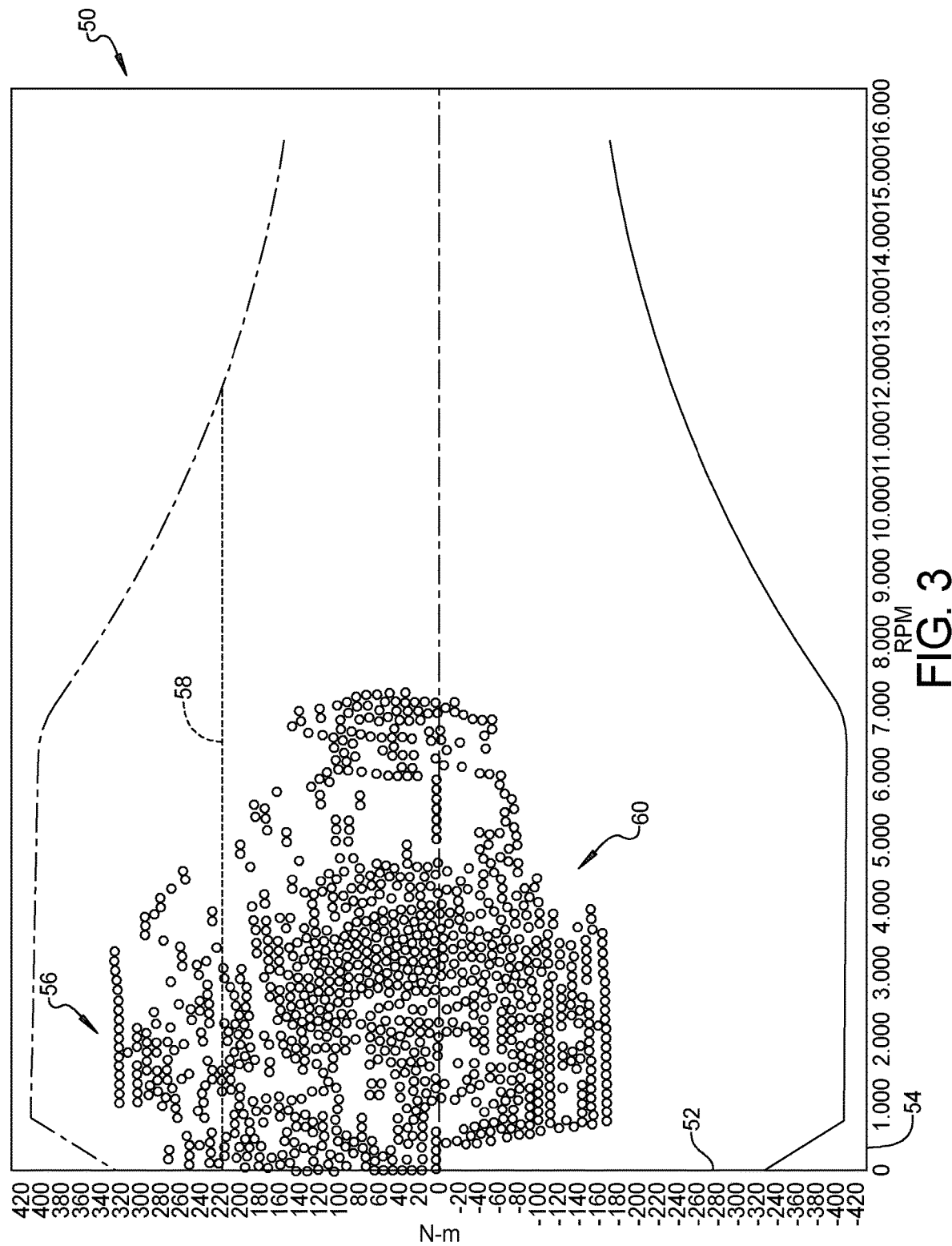
FIG. 3 is a graph providing motor loading data points for a motor air gap torque compared to a motor shaft speed for operation of the system of FIG. 1.

The following description is merely exemplary in nature and is not intended to limit the present disclosure, application, or uses.

Referring to FIG. 1, a system and method for extending a range and maneuverability of a battery-electric-vehicle (BEV) and powered trailer 10 includes a BEV 12 which is releasably connected to a powered trailer 14. According to several aspects the BEV 12 defines a pickup truck, however the BEV 12 is not limited to a type of vehicle and may therefore define any automobile vehicle including but not limited to a passenger car, an sport utility vehicle (SUV), a van, a minivan, or the like. To enhance an operational range and functionality of the BEV 12, the powered trailer 14 is provided with a propulsion unit 16. According to several aspects, the propulsion unit 16 may be configured as a battery pack 17, which may be an energy pack or a power pack. According to several aspects, the propulsion unit 16 may be configured as at least one motor 34 and according to several aspects two or more motors 34 described below in reference to FIG. 2 providing motive force to provide propulsion of the powered trailer 14. According to other aspects, the propulsion unit 16 includes the battery pack 17 and the at least one motor 34.

When the propulsion unit 16 incorporates the battery pack 17, the battery pack 17 may include one or more batteries in a battery pack array. The battery pack 17 may be configured as an energy pack having multiple battery cells delivering a steady power supply for an extended period of time. The battery pack 17 may also be configured as a power pack capable of delivering a power higher than a power of the energy pack for a duration shorter than the energy pack. According to several aspects the battery pack 17 may be positioned below a bed or platform 18 of the powered trailer 14, for example stored within a housing 20 positioned below the platform 18, or the battery pack 17 may be supported on or above the platform 18.

The battery pack 17 is rechargeable and may be recharged simultaneously during a recharging operation of a vehicle energy pack 22 which provides operational energy for the BEV 12. The battery pack 17 may also be recharged independently of the BEV 12 which permits recharging at a storage location of the powered trailer 14 or with the powered trailer 14 disengaged from the BEV 12.

The powered trailer 14 is provided with at least two wheels 24 with at least one of the at least two wheels 24 positioned on opposed sides of the powered trailer 14 to provide balanced support of the platform 18. The BEV 12 is similarly provided with at least four vehicle wheels 26 as is known, with at least one of the vehicle wheels 26 defining a driven wheel. According to several aspects, energy of the battery pack 17 may be transferred to the vehicle energy pack 22 and thereby may be transferred to one or more motors providing propulsion power for the BEV 12.

During a towing operation, the powered trailer 14 is mechanically and electrically connected to the BEV 12 with operation of the propulsion unit 16 and the vehicle energy pack 22 connected to and controlled by a vehicle module 28. According to several aspects, the vehicle module 28 may include one or more processors, which in exemplary aspects are microprocessors residing in the vehicle module 28. The processors in exemplary aspects may also reside in a computer independent of the vehicle module 28, or in the cloud. The processors may perform distributed or parallel processing protocols and may include, for example, application specific integrated circuits, a programmable gate array including a field programmable gate array, a digital-signal processor, or a front-end processor. The processors may also include or access information stored in a memory 30 with which the processors are individually operatively coupled. Memory is understood as a physical device capable of storing information temporarily, such as in the case of random-access memory, or permanently, such as in the case of read-only memory. Representative physical devices include hard disk drives, solid state drives, optical discs, or storage accessible through the cloud over networks.

The vehicle module 28 provides for communication between the BEV 12 and the powered trailer 14. According to several aspects the vehicle module 28 may also communicate with a communication center remote from the BEV 12 such as a cloud-based communication center. The vehicle module 28 allows for monitoring energy analyses and control of energy transfer between first BEV 12 and the powered trailer 14. For transfer of energy and to provide a communication path a communication link 32 connects the BEV 12 to the powered trailer 14.

Referring to FIG. 2 and again to FIG. 1, according to several aspects at least one of the at least two wheels 24 of the powered trailer 14 includes the at least one motor 34 which may be incorporated within a wheel hub 36. According to other aspects, individual wheels of the at least two wheels 24 of the powered trailer 14 includes one of the at least one motor 34 such that an individual wheel of the at least two wheels 24 define powered wheels. According to several aspects, the at least one motor 34 is provided with electrical energy from the battery pack 17. According to several aspects energy for powered operation of the at least one motor 34 of the powered trailer 14 may also be supplemented with energy from the vehicle energy pack 22 of the BEV 12, or energy may be provided by the battery pack 17 and the vehicle energy pack 22.

Providing direct propulsion of any of the at least two wheels 24 of the powered trailer 14 using one or more of the at least one motor 34 allows the powered trailer 14 to provide acceleration capability for the powered trailer 14 and for the BEV 12. Operation of the at least one motor 34, either individually or in tandem also increases maneuverability of the powered trailer 14 and the BEV 12 in a forward or drive direction as well as in a backward or reverse direction.

With continued reference to FIGS. 1 and 2, according to several aspects the at least one motor 34 of the powered trailer 14 may also be operated with the powered trailer 14 separated from the BEV 12 using energy from the battery pack 17, which promotes ease of positioning the powered trailer 14 for storage and to maneuver the powered trailer 14 for connection to the BEV 12. An attachment device may also be provided with the powered trailer 14 permitting automatic connection of the powered trailer 14 to the BEV 12. According to several aspects a trailer module 38 may be provided on the powered trailer 14 which functions similar to and may communicate with the vehicle module 28. The trailer module 38 may also operate independently of the vehicle module 28. The trailer module 38 assists during operation of the at least one motor 34 of the powered trailer 14 including during independent operation of the at least one motor 34 and may assist during energy transfer and for recharging operation of the battery pack 17. Similar to the vehicle module 28 the trailer module 38 provides for communication between the BEV 12 and the powered trailer 14. According to several aspects the trailer module 38 may also communicate with the communication center remote from the powered trailer 14 such as a cloud-based communication center. The vehicle module 28 further provides for monitoring energy analyses and control of energy transfer between first BEV 12 and the powered trailer 14.

According to several aspects and with continued reference to FIGS. 1 and 2 the at least one motor 34 defines a first electric motor 40 positioned in a first wheel hub 42 of the powered trailer 14 and a second electric motor 44 positioned in a second wheel hub 46 of the powered trailer 14. The first electric motor 40 and the first wheel hub 42 are positioned oppositely from the second electric motor 44 and the second wheel hub 46 to balance propulsion power delivered to the powered trailer 14. According to further aspects the at least one motor 34 described above is not limited by connection to the wheel hub 36 and may instead be connected to and rotate at least one axle 48 of the towed trailer 14, for example using a differential as is known. During forward operation and particularly during reverse operation of the powered trailer 14 selective operation of the at least one motor 34, particularly by operation of the first electric motor 40 at a different speed than the second electric motor 44 improves a powered trailer maneuverability.

Referring to Table 1 below, and again to FIG. 1, the powered trailer 14 can be configured in four ways to provide individual subsets of benefits.

TABLE 1

|  | Config. A | Config. B | Config. C |
|---|---|---|---|
| Configuration | Motors, No Power Source | Motors, Power Pack | Motors, Energy Pack |
| Range | 0 | + | ++ |
| Towing Capability | + | + | 0 |
| Handling | + | + | + |
| Cost | − | −− | −−−− |

A first configuration defining a Configuration A increases a towing capability of the powered trailer 14 while relying on an energy storage capability of the vehicle energy pack 22 of the BEV 12. Configuration A provides one or more of the at least one motor 34 to power at least one of the at least one wheels 24, with the at least one motor 34 drawing operational power from the vehicle energy pack 22 of the BEV 12. Provision of the at least one motor 34 improves trailer handling and provides a reduced trailer cost by eliminating a battery pack 17 from the powered trailer 14.

A second configuration defining a Configuration B delivers all of the benefits of the present disclosure. Configuration B includes the at least one motor 34 providing propulsion power to the powered trailer 14 and provides energy for operation of the at least one motor 34 and for supplementing the energy of the vehicle energy pack 22 of the BEV 12 by use of a power pack as the battery pack 17. An operational range of the BEV 12 and the powered trailer 14 are improved with Configuration B, together with an improved towing capability and trailer handling. A cost of Configuration B is reduced, as the cost of the power pack in place of an energy pack is lower and offsets a cost of the at least one motor 34.

A third configuration defining a Configuration C delivers the benefits of Configuration B and further provides additional range, with additional cost. Configuration C includes an energy pack as the battery pack 17 providing maximum range advantage. A towing capability of Configuration C is deemed to be a neutral benefit as weight of the at least one motor 34 and the energy pack as the battery pack 17 increase a mass of the powered trailer 14. A handling capability of Configuration C is an improvement compared to trailers having no self-power. A cost of Configuration C is deemed to be the highest cost of the three configurations.

Referring to FIG. 3 and again to FIGS. 1 and 2, a graph 50 provides motor loading data points for a motor air gap torque 52 measured in Nm compared to a motor shaft speed 54 in rpm. A First Zone 56 includes data points representing how shifting propulsion torque to the powered trailer 14 reduces a motor loading on the BEV 12, with points above a reference line 58 eliminated. Reducing motor loading improves efficiency and lowers a thermal loading on the vehicle energy pack 22 of the BEV 12. A Second Zone 60 provides data points identifying effects of regenerative braking by the powered trailer 14. Regenerative braking used with the powered trailer 14 having the Configuration B or the Configuration C identified above in reference to Table 1 improves an urban driving range when a regenerative braking charging capability from the BEV 12 is reduced or lost. Regenerative braking provided by the BEV 12 ramps out below approximately 10 kilometers per hour vehicle speed, while regenerative braking charging capability from the powered trailer 14 is fully available below 10 kilometers per hour trailer speeds continuously down to a zero-driving speed.

Combining the powered trailer 14 with the towing vehicle, BEV 12 provides a reduction in thermal loading of the BEV 12 by: 1) Reducing or eliminating inefficient operating points of the propulsion system in the BEV 12 vehicle by providing a torque assist; 2) Decreases heat rejection for the combined units of the BEV 12 and the powered trailer 14; 3) Provides overall system efficiency increases by reducing power consumption per mile, thereby providing a range increase; 4) The powered trailer 14 supplements the towing capacity as the towing vehicle, BEV 12, and the BEV 12 operates within its thermal limits while simultaneously towing a higher capacity than would be obtained with a non-powered trailer; and 5) Using regenerative braking, the powered trailer 14 recuperates a portion of the kinetic energy absorbed by the powered trailer 14, reducing an energy output for towing the powered trailer 14.

The system and method of the present disclosure also improves the following driveability items during a towing operation. An acceleration capability of the BEV 12 when towing the powered trailer 14 is increased by the torque provided by the at least one motor 34. A trailer maneuverability is also improved, particularly when individually drivable wheels are provided.

The present system incorporates at least one motor 34 to power the wheels 24 of the powered trailer 14 or to power one or more axle(s) 48 of the towed powered trailer 14 and optionally includes a battery pack or an energy pack which may be modular in size. The system operates in conjunction with a primary towing vehicle such as the BEV 12.

A method of operation of the system proportionally distributes torque for propulsion between the towed powered trailer 14 and the towing vehicle, the BEV 12, optimizing the operating efficiency of the overall combination of towing and towed elements. The method of operation of the system may improve maneuverability of the towed powered trailer 14 by using wheel torque when equipped with a motor at individual wheels of the powered trailer 14. The method of distributing torque between the towing vehicle, BEV 12 and the powered trailer 14 may predict an axle or a motor torque request using an advanced driver assistance system (ADAS).

The system of the present disclosure incorporates a modular rechargeable energy storage system (RESS) that may include modular packs in a tray that can be integrated with the chassis of the powered trailer 14.

A system and method of the present disclosure splits the energy and torque between the towing BEV and a powered trailer. A motorized smart trailer with (wheel) motors or motors connected to an axle and a modular rechargeable energy storage system are provided. Communication with a main powertrain in the towing vehicle, BEV 12 provides torque and energy management and trailer maneuvering control. A launch assist and an acceleration assist provided by the powered trailer 14 makes a mass of the powered trailer 14 less visible the operator of the BEV 12.

A system and method for extending a range and maneuverability of a battery-electric-vehicle (BEV) and powered trailer 10 of the present disclosure offers several advantages. These include splitting energy and torque between the towing vehicle BEV 12 and the powered trailer 14. The powered trailer 14 may be a motorized smart trailer having at least one motor 34 and a modular rechargeable energy storage system defining the battery pack 17. Communication is provided between the powered trailer 14 and a vehicle module 28 in the towing BEV 12 providing torque and energy management, and maneuvering control. The powered trailer 14 provides a launch assist to the BEV 12 and further provides an acceleration assist to make a mass of the powered trailer 14 less noticeable to the BEV 12. The powered trailer 14 also provides the propulsion unit 16 for the launch and acceleration assist and when the battery pack 17 is present provides for regenerative charging of the battery pack 17 and the vehicle energy pack 22 of the BEV 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system to extend a range and maneuverability of an automobile vehicle during a towing operation, comprising:
    a battery-electric-vehicle (BEV) having a vehicle energy pack providing operational energy for the BEV;
    a powered trailer releasably connected to the BEV; and
    a propulsion unit provided with the powered trailer and in communication with the BEV, the propulsion unit enhancing launch of the BEV and providing an acceleration assist to powered trailer and to the BEV,
    wherein the propulsion unit is configured as a first motor and a second motor positioned opposite the powered trailer from the first motor, the propulsion unit incorporating a battery pack, the battery pack providing battery pack energy to supplement the operational energy of the vehicle energy pack, the first motor and the second motor energized by the battery pack to provide a propulsion force to the powered trailer, at least one motor arranged to draw operational power from the vehicle energy pack of the vehicle and from the battery pack of the powered trailer,
    wherein energy of the battery pack is transferred to the vehicle energy pack and is transferred to at least one motor providing propulsion power for the BEV.

2. The system of claim 1, wherein at least one of the first motor and the second motor is energized to provide a propulsion force to the powered trailer and to enhance propulsion of the BEV.

3. The system of claim 2, wherein at least one of the first motor and the second motor is energized solely by the vehicle energy pack of the BEV.

4. The system of claim 1, wherein one of the first motor and the second motor is energized to provide a motive force to the powered trailer.

5. The system of claim 1 further comprising a trailer module provided with the powered trailer, the trailer module communicating between the powered trailer and the BEV and to the first motor and the second motor.

6. The system of claim 5, wherein the trailer module controls a first speed of the first motor different than a second speed of the second motor to enhance maneuverability of the powered trailer.

7. A system to extend a towing range and maneuverability of an automobile vehicle during a towing operation, comprising:
    a battery-electric-vehicle (BEV) having a vehicle energy pack providing operational energy to the BEV;
    a powered trailer releasably connected to the BEV;
    a trailer module provided with the powered trailer, the trailer module communicating between the powered trailer and the BEV; and
    a propulsion unit provided with the powered trailer and in communication with trailer module and with the BEV using the trailer module, the propulsion unit enhancing launch of the BEV and providing an acceleration assist to the BEV,
    wherein the propulsion unit is configured as a first motor and a second motor positioned opposite the powered trailer from the first motor, the propulsion unit incorporating a battery pack, the battery pack providing battery pack energy to supplement the operational energy of the vehicle energy pack, the first motor and the second motor energized by the battery pack to provide a propulsion force to the powered trailer, at least one motor arranged to draw operational power from the vehicle energy pack of the vehicle and from the battery pack of the powered trailer,
    wherein energy of the battery pack is transferred to the vehicle energy pack and is transferred to at least one motor providing propulsion power for the BEV.

8. The system of claim 7, wherein the propulsion unit is configured as one of the first motor and the second motor connected to and rotating at least one axle of the powered trailer, one of the first motor and second motor is energized by the battery pack to provide a propulsion force to the powered trailer.

9. The system of claim 7, including a vehicle module provided with the BEV, wherein during a towing operation of the powered trailer by the BEV the powered trailer is mechanically and electrically connected to the BEV with the propulsion unit and the vehicle energy pack connected to and controlled by the vehicle module.

10. The system of claim 7, including a communication link connecting the BEV to the powered trailer to transfer the operational energy and to provide a communication path between the BEV and the powered trailer.

11. A method to extend a towing range and maneuverability of an automobile vehicle during a towing operation, comprising:
   positioning a rechargeable vehicle energy pack in a battery-electric-vehicle (BEV) to provide operational energy to the BEV;
   releasably connecting a powered trailer to the BEV;
   providing a trailer module with the powered trailer, with the trailer module communicating between the powered trailer and the BEV;
   connecting a propulsion unit positioned on the powered trailer in communication with the BEV via the trailer module, the propulsion unit enhancing launch of the BEV and providing an acceleration assist to the BEV, wherein the propulsion unit is configured as a first motor and a second motor positioned opposite the powered trailer from the first motor, the propulsion unit incorporating a battery pack, the battery pack providing battery pack energy to supplement the operational energy of the vehicle energy pack, the first motor and the second motor energized by the battery pack to provide a propulsion force to the powered trailer, at least one motor arranged to draw operational power from the vehicle energy pack of the vehicle and from the battery pack of the powered trailer, wherein energy of the battery pack is transferred to the vehicle energy pack and is transferred to at least one motor providing propulsion power for the BEV; and
   energizing the propulsion unit by command from the trailer module to enhance launch of the BEV and to provide an acceleration assist to the BEV.

12. The method of claim 11, further including:
   commanding operation of a first motor of the propulsion unit and a second motor of the propulsion unit; and
   connecting the BEV to the powered trailer using a communication link.

13. The method of claim 11, further including reducing a thermal load on the BEV by distributing a torque between the BEV and the powered trailer thereby increasing an overall system efficiency.

* * * * *